(No Model.)

A. KRIEGER.
DETACHABLE TOOTH SAW.

No. 544,438. Patented Aug. 13, 1895.

WITNESSES:

M. McDonald
J. A. Barnes

INVENTOR:
Andrew Krieger.

By
Thurman & Silvius
ATTORNEYS.

United States Patent Office.

ANDREW KRIEGER, OF INDIANAPOLIS, INDIANA.

DETACHABLE-TOOTH SAW.

SPECIFICATION forming part of Letters Patent No. 544,438, dated August 13, 1895.

Application filed May 3, 1895. Serial No. 547,988. (No model.)

*To all whom it may concern:*

Be it known that I, ANDREW KRIEGER, a citizen of the United States, residing at Indianapolis, in the county of Marion and State of Indiana, have invented certain new and useful Improvements in Detachable-Tooth Saws; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in detachable-tooth saws, and has reference to Patent No. 292,659, dated January 29, 1884; and it consists of a bridge-piece of novel design and provided with the usual recesses for the reception of the tooth and clamp, and is secured to a saw-blade in a peculiar manner, so as to admit of the tooth being rigidly held by a clamp without throwing out of alignment the cutting-edge or disturbing the tension of the saw, as will be fully described hereinafter.

Figure 1:
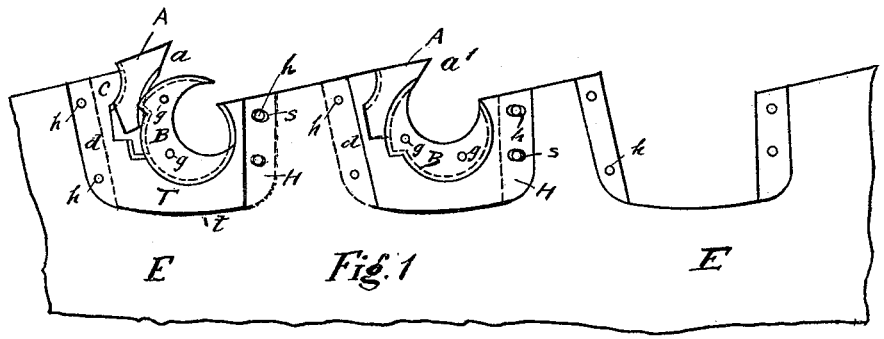
Figure 2:
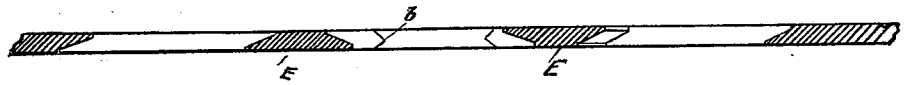
Figure 3:
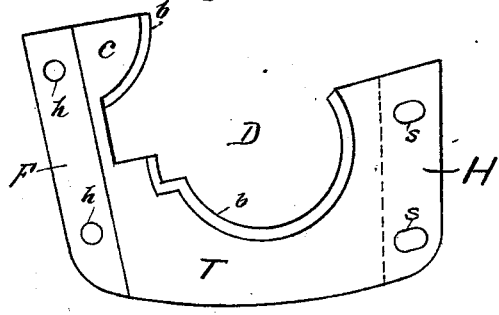
Figure 4:
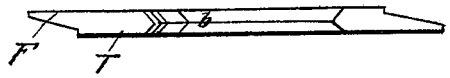

Referring to the drawings, Figure 1 is a side elevation of saw-blade, bridge, clamp, and tooth. Fig. 2 is a plan of edge, showing the manner of splicing the bridge to saw-blade. Fig. 3 is an enlarged side elevation of the bridge with clamp and tooth removed, and Fig. 4 is a plan of edge of same.

Heretofore it has been impracticable to adapt the usual clamping method as employed in circular saws to band, gang, or other long saws, because the recesses were cut into the blade and the pressure of the clamp against the back of the preceding tooth was so great as to cause expansion along the cutting-edge and a strain immediately below the same, thereby unfitting the saw for good work. To remedy this evil efforts have been made with clamping devices which were confined to the space of one tooth-like projection, and while they apparently succeeded in this particular direction, they failed to provide a means to brace and support the teeth sidewise to withstand the pressure in cutting. Another obstacle is met with on account of the continual bending of band-saw blades in going over the pulleys, which changes the bearings of grooves and causes the clamp to loosen its grip on the tooth.

My object is to overcome all these serious difficulties and I have constructed the bridge-piece T to bridge and connect two tooth-like projections on saw-blade, so as to be able to have a perfect elastic support for the clamp B to bear against and keep all parts in line without bearing against the preceding tooth-like projection. I have also provided for the free movement of the bridge-piece T, so as to be independent of bending of the blade in going over the pulleys. Said bridge-piece is made in a die and has formed therein a tooth-socket D to receive the tooth A and clamp B. The edges opposite, formed by said socket D, except at its bottom, have removed therefrom a sufficient amount of material to form the splices F or laps preferably taper and of sufficient depth to secure strength and correspond to like splices or laps on saw-blade. The end $d$ nearest to tooth is joined and rigidly fastened by means of rivets $h$ and soldered and forms a continuation of saw-blade E. The opposite or clamp-end lap H is provided with oblong holes S to correspond with like holes in lap of saw-blade and are beveled or countersunk on their outer sides to receive headed pins $h$ to hold together the laps sidewise, but allowing the end H of the bridge-piece to move in the direction parallel to the cutting-edge of the saw, yielding and accommodating itself to the pressure of the clamp, thus forming a spring to supplement and prevent back-pressure of the clamp. The laps F on ends of the bridge-piece are on opposite sides from one another, likewise on the saw-blade, and alternate in order from one side to the other of saw-blade, as shown in Fig. 2. It is necessary to do this on account of the inclination of said splices to slightly yield under the heavy feed, and might if spliced all on one side cause the saw to lead to that side. In some cases this order may be dispensed with, but I prefer to employ the same. The under side $t$ of the bridge-piece is square-edged and separated from the saw-blade, so as to be independent of same in going over the pulleys and preserve a true bearing in the tongue and grooved parts of clamp and socket respectively. The bridge by its lap end $d$ nearest to tooth being rigidly secured, riveted, and soldered, thus forms a continuation of saw-blade. The tooth is put in position, as at $a$, Fig. 1. The clamp B turns inward and past the tooth A until the same is secured, as at $a'$, Fig. 1. In turning the clamp B it presses in opposite direction from the tooth and against the expansible end H of the bridge-piece, which by having the oblong slots S is allowed to expand and yet support the action of clamp without said end pressing longitudinally against that portion of the blade adjoining. $g\ g$ are the holes to receive key to tighten and release said clamp. In removing the tooth the reverse action takes place and the bridge returns to its former position. It will therefore be observed that all the above enumerated difficulties are removed and the desired results attained.

Having thus described my invention, what I claim, and desire to secure by Letters Patent, is—

1. The combination with a saw-blade, a bridge-piece T or support, having formed therein, a recess or socket for the reception of tooth A, and clamp B to correspond thereto in shape; said bridge-piece being rigidly fastened by its end $d$ nearest to tooth, to the saw-blade, while the other, or clamp end H, is held and secured so as to allow it to move in the direction of the pressure exerted by the clamp, substantially and for the purpose as shown and described.

2. The combination with a saw-blade, a bridge-piece T provided with recess for tooth A and clamp B to correspond thereto, all parts being rigidly fastened by end of said bridge-piece nearest to the tooth, while the other or clamp end is left free to move edgewise by means of oblong holes or slots S, the corresponding part of saw-blade having pins $h$ to enter said oblong holes or slots S, and headed so as to secure to its place sidewise, the said bridge-piece, for the purpose and in the manner as shown and described.

3. The combination with a saw-blade, a bridge-piece T containing a socket, a tooth A and clamping device B to correspond thereto in shape; said bridge-piece being rigidly fastened by its end $d$ nearest the tooth to the saw-blade, its clamp end H being movable edgewise, accommodating itself to and supplementing the pressure of the clamp while its bottom is left to move edgewise and sidewise, for the purpose and substantially as shown and described.

4. The combination with a saw-blade, a bridge-piece T with socket, tooth A and clamp B, provided with a rigid and a movable end, each terminating in a lap, but on opposite sides from one another, and corresponding to like laps on saw-blade, and so constructed and applied as to alternate in order from side to side of saw-blade, for the purpose and in the manner as shown and described.

In testimony whereof I affix my signature in presence of two witnesses.

ANDREW KRIEGER.

Witnesses:
E. T. SILVIUS,
JNO. S. THURMAN.